United States Patent
Dally et al.

(10) Patent No.: US 7,043,562 B2
(45) Date of Patent: *May 9, 2006

(54) IRREGULAR NETWORK

(75) Inventors: William J. Dally, Stanford, CA (US); William F. Mann, Sudbury, MA (US); Philip P. Carvey, Bedford, MA (US)

(73) Assignee: Avivi Systems, Inc., North Billerica, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/457,718

(22) Filed: Jun. 9, 2003

(65) Prior Publication Data

US 2003/0212877 A1    Nov. 13, 2003

Related U.S. Application Data

(63) Continuation of application No. 09/249,430, filed on Feb. 12, 1999, now Pat. No. 6,598,145.

(51) Int. Cl.
*G06F 15/173* (2006.01)

(52) U.S. Cl. ............................ 709/238; 712/1; 712/11; 712/12; 712/15; 712/16; 712/29

(58) Field of Classification Search .................... 712/1, 712/11, 12, 15–16, 29; 709/238
See application file for complete search history.

(56) References Cited

U.S. PATENT DOCUMENTS 5,068,859 A * 11/1991 Collins et al. ............... 714/795
5,170,482 A * 12/1992 Shu et al. ..................... 712/12
5,198,979 A    3/1993 Moorhead et al.
5,517,619 A * 5/1996 Muramatsu et al. ........ 709/243
5,583,990 A    12/1996 Birrittella et al.
5,859,981 A * 1/1999 Levin et al. ................. 709/238
6,205,532 B1   3/2001 Carvey et al.
6,370,145 B1   4/2002 Dally et al.

OTHER PUBLICATIONS

Stunkel, C.B., et al., "The SP2 High-Performance Switch," IBM Systems Journal, vol. 34, No. 2, 1995, pp. 184-204.
Dally, W.J., "Network Processor Architectures For Message Driven Computers," VLSI and Parallel Computation, Edited by Suaya and Birtwistle, Morgan Kaufmann, 1990.
U.S. Appl. No. 09/083,722 to Carvey et al. (Now Reference AG).
U.S. Appl. No. 08/918,556 to Dally et al. (Now Reference AH).

* cited by examiner

*Primary Examiner*—Frantz B. Jean (74) *Attorney, Agent, or Firm*—Hamilton, Brook, Smith & Reynolds, P.C.

(57) ABSTRACT

Irregularities are provided in at least one dimension of a torus or mesh network for lower average path length and lower maximum channel load while increasing tolerance for omitted end-around connections. In preferred embodiments, all nodes supported on each backplane are connected in a single cycle which includes nodes on opposite sides of lower dimension tori. The cycles in adjacent backplanes hop different numbers of nodes.

9 Claims, 7 Drawing Sheets

Figure 7A
Even

Figure 7B
Odd

IRREGULAR NETWORK

RELATED APPLICATION

This application is a continuation of U.S. application Ser. No. 09/249,430, filed Feb. 12, 1999 U.S. Pat. No. 6,598,145. The entire teachings of the above application are incorporated herein by reference.

BACKGROUND OF THE INVENTION

An interconnection network consists of a set of nodes connected by channels. Such networks are used to transport data packets between nodes. They are used, for example, in multicomputers, multiprocessors, and network switches and routers. In multicomputers, they carry messages between processing nodes. In multiprocessors, they carry memory requests from processing nodes to memory nodes and responses in the reverse direction. In network switches and routers, they carry packets from input line cards to output line cards. For example, pending U.S. patent application Ser. No. 08/918,556, filed by William J. Dally, Philip P. Carvey, Larry R. Dennison and P. Alan King for Internet Switch Router, describes the use of a three-dimensional torus interconnection network to provide the switching fabric for an internet router.

Figure 1:
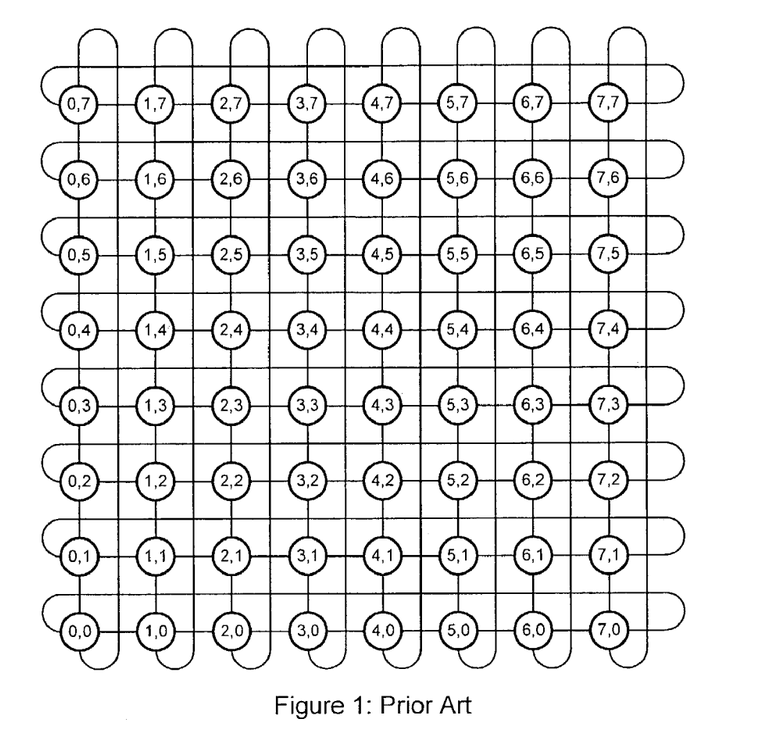
FIG. 1 is an illustration of a prior art 8-ary 2 cube.
Figure 2:
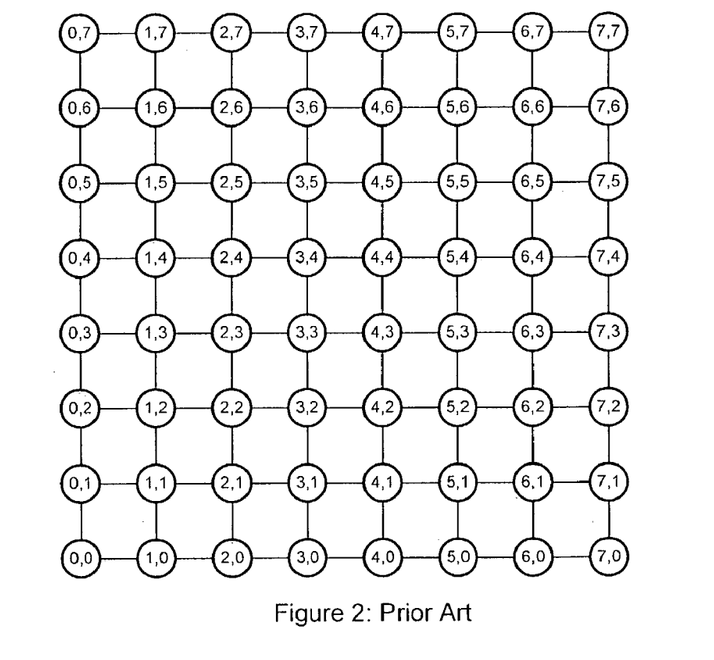
FIG. 2 is an illustration of a 8-ary 2 mesh.

The arrangement of the nodes and channels in a network defines its topology. FIG. 1, for example, illustrates a two-dimensional, radix-8 torus topology, also called an 8-ary 2-cube. In this topology each node is designated by a two-digit radix-8 address. Channels in both directions connect each pair of nodes whose addresses differ by one in exactly one digit modulo 8. That is, node (a,b) is connected to nodes (a−1,b),(a+1,b),(a,b−1), and (a,b+1) where the addition and subtraction are performed modulo-8. Each node in this topology has degree 4 since it is connected to four other nodes. A related topology, an 8-ary 2-mesh, is shown in FIG. 2. This network is identical to the 8-ary 2-cube except that the 'end-around' connections from node 7 to node 0 in each dimension are omitted. While the mesh network is simpler to wire, it has significantly lower performance than the torus network as will be described below.

Meshes and tori may be constructed with different radices and numbers of dimensions, and other network topologies are possible such as crossbars, trees, and butterfly networks. Several popular topologies are described, for example, by William J. Dally, "Network and Processor Architectures for Message-Driven Computers," in *VLSI and Parallel Computation*, Edited by Suaya and Birtwistle, Morgan Kaufmann, 1990.

The topology chosen for an interconnection network is constrained by the technology used to implement the network. Pin-count constraints on chips, circuit boards, and backplanes, for example, limit the maximum degree of each network node. Wire-length constraints limit the maximum distance a single channel can traverse when the network is mapped into a physical packaging structure.

Figure 3:
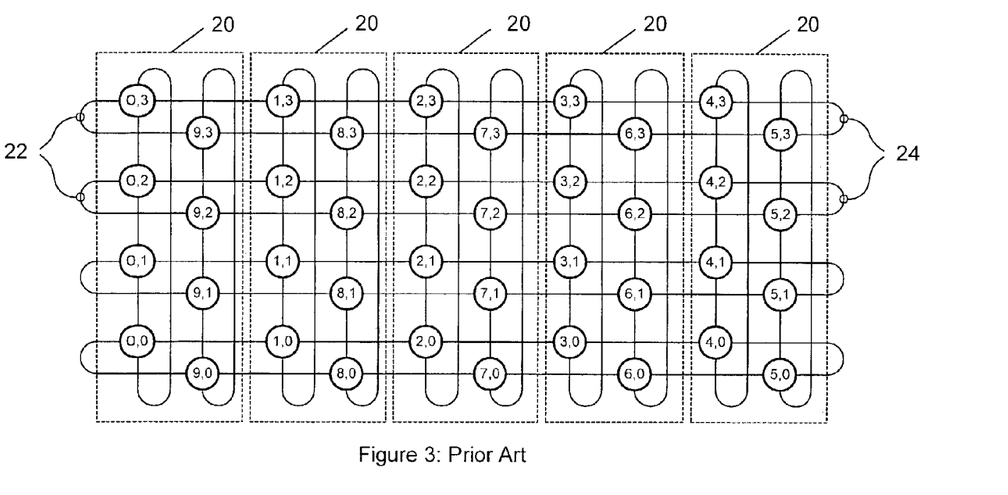
FIG. 3 is an illustration of a prior art folded torus packaged onto five backplanes.

Low-dimensional (2–3 dimensions) torus and mesh networks have become popular in recent years in part because they offer good performance while having a small node degree and uniformly short wires when mapped to two or three dimensional electronic packaging systems. While at first it may appear that the end-around channels in a torus network result in long wires, these long wires can be avoided by folding the torus as illustrated in FIG. 3. The figure shows how an 8×4 torus that is folded in the x-dimension is mapped onto a set of backplanes 20. Each node is packaged on a circuit card and eight of these circuit cards are inserted in each backplane 20. The circuit cards in each backplane span two x coordinates and the entire y dimension. The y-dimension channels are realized entirely in the backplane while the x-dimension channels are realized by connections between backplanes. Folding the torus allows this topology to be realized with each x-channel connecting no further than the adjacent backplane.

To expand the network of FIG. 3, it is necessary to first break the loop-back connection 22 or 24 at the end of the x-dimension and then make a connection to a new backplane. An efficient method for reconfiguring the network in this manner is disclosed in pending U.S. patent application Ser. No. 09/083,722, filed by Philip P. Carvey, William J. Dally and Larry R. Dennison for Apparatus and Methods for Connecting Modules Using Remote Switching.

Two important measures of the quality of a topology are average path length and maximum channel load. The average path length, $D_{avg}$, of a network is the average number of channels that must be traversed to send a packet between two randomly selected nodes in a network. In the radix-8, two-dimensional torus network of FIG. 1, the average packet traverses two channels in each dimension, giving Pavg=4. In general, the average path length in a k-ary n-cube is kn/4 (for k even) and n(k/4−1/4k) (for k odd) while the average path length in a k-ary n-mesh is n(k/3−1/3k). Average path length is a good predictor of network latency. The lower the average path length of a topology, the lower is the latency of a network using that topology, assuming the latency of an individual channel remains constant.

The maximum channel load of a network, $C_{max}$, is the largest number of packets that traverse a single channel when all nodes send packets to all other nodes divided by the number of nodes squared. In the 8-ary 2-cube network of FIG. 1, for example, the channel load is uniform with $C_{max}=C_i=1$ for every channel i. In general, the maximum channel load in a k-ary n-cube is k/8 while the maximum channel load in a k-ary n-mesh is k/4. Maximum channel load is a good predictor of the throughput of a network. The lower the maximum channel load of a topology, the higher is the throughput of a network using that topology, assuming the bandwidth of an individual channel remains constant.

SUMMARY OF THE INVENTION

While the folded torus network offers a method of packaging a regular k-ary n-cube network so that all of the channels remain short, it is inherently inefficient because nodes that are packaged very close to one another can communicate only via circuitous routes. For example, in FIG. 3, nodes (2,0) and (7,0) are on the same backplane. A message from (2,0) to (7,0), however, must leave this backplane and traverse five backplane-backplane connections before arriving back at the backplane. The problem becomes even more acute as the x-dimension grows in radix. A more efficient topology would minimize this off-backplane communication by allowing direct communication between nodes on the same backplane. A more efficient topology would also provide good performance without needing an end-around connection that must be removed for expansion.

One mechanism for increasing system performance in terms of average path length and maximum channel load and for making a network less susceptible to loss of end around connections is to add one or more dimensions to the network. However, adding a dimension increases the node degree by two, thus increasing the complexity of each node.

In accordance with one aspect of the invention, benefits of an added dimension without the increased node degree can be obtained by connecting one subset of channels within the network in one dimension and connecting another subset of the network channels in a different dimension. By distributing the nodes connected by the two channel subsets throughout the network, messages transferred through the network always have ready access to each dimension, but since each node need only be connected to one dimension or the other, there is no increase in degree. The concept of interleaving differing connections along one or more dimensions can be extended to other configurations for improved performance. Further, connections can be modified to assure that all nodes on a backplane, for example, are connected in a single cycle. The increased path lengths between some nodes resulting from the addition of such local connections can generally be masked by alternating the configurations from backplane to backplane.

In accordance with the invention, a plurality of channels connect a plurality of nodes in each connection network. A first subset of the channels connects the nodes is in a first dimension. A second subset of the channels connects the nodes in at least a second dimension, and connection of the second subset of channels differs at different coordinates along the first dimension.

In a preferred embodiment, the second subset of the channels connects the nodes in cycles or linear arrays in a second dimension and the ordering of the nodes in cycles or linear arrays is different at different coordinates along the first dimension. A connection of the second subset of channels at a first set of coordinates in the first dimension connects nodes whose coordinates in the second dimension differ by a first number. The connection of the second subset of channels in a second set of coordinates in the first dimension connects nodes whose coordinates in the second dimension differ by a second number. Thus, for example, in even numbered positions along the x-dimension, adjacent nodes in the backplane may be connected. However, in odd numbered positions, every other node may be connected.

Preferably, cycles or linear arrays of the second subset of the channels connect multiple nodes of each of plural cycles or linear arrays in the first dimension. For example, where the channels of the first dimension are folded, the second subset of the channels may connect nodes on opposite sides of the folds, thus reducing loading in the first dimension.

A first set of coordinates in the first dimension of the second subset of channels may connect the nodes into a cycle or linear array along a second dimension while, at a second set of coordinates in the first dimension, the second subset of channels connect the nodes into a cycle or linear array along a third dimension.

A preferred embodiment of the invention is a three-dimensional array. The second subset of the channels includes channel connecting nodes in a second dimension and channels connecting nodes in a third dimension. The connections in the third dimension differ at different coordinates of the first and second dimensions.

Nodes connected in at least the second dimension at a coordinate along the first dimension may be packaged in a single packaging module, such as on a backplane or other circuit board.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 4:
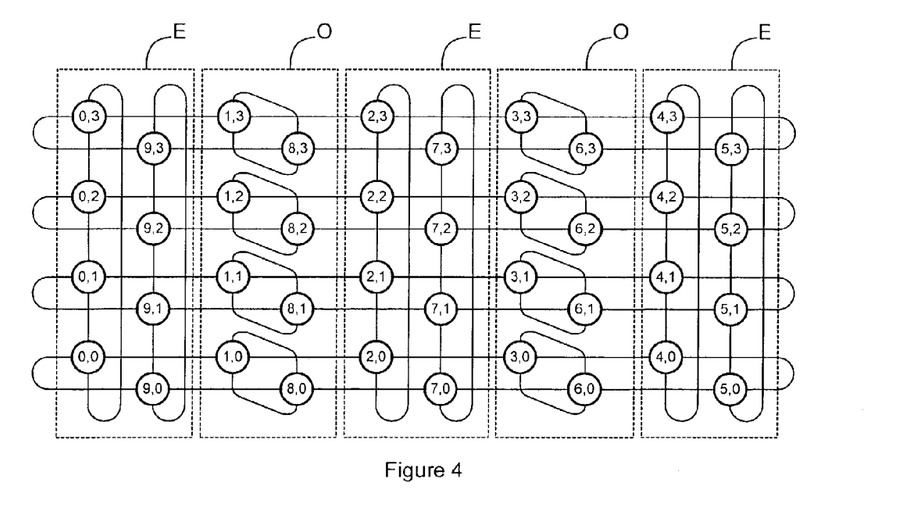
FIG. 4 is an alternating 3 cube embodying the present invention packaged onto five backplanes.

A network that allows more local communication between nodes that are physically close to one another is shown in FIG. 4. In this network even-numbered backplanes E are wired identically to the backplanes of FIG. 3 while odd-numbered backplanes O connect the nodes on opposite sides of each x-loop that shares the backplane. This arrangement allows a node to access any other node on its backplane in at most six hops and crossing at most two backplane connectors.

Figure 5:
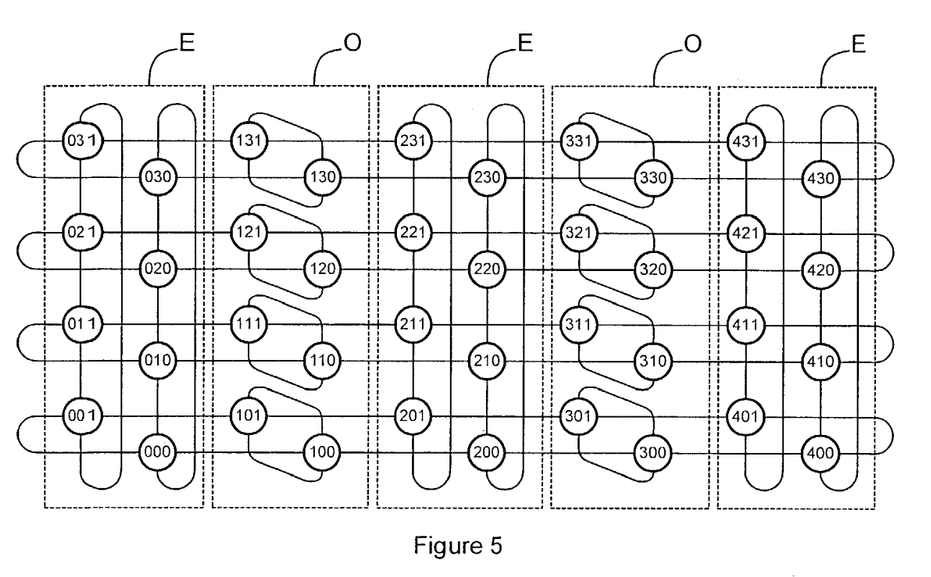
FIG. 5 is the alternating 3 cube of FIG. 4 with alternate node labeling showing the 3 cube nature of the network.

The topology of FIG. 4 is best thought of as a three-dimensional network. The x-dimension selects the backplane, the y-dimension selects a pair of nodes within the backplane (as before), and the z-dimension selects the node within the pair. FIG. 5 shows the same network with the nodes renumbered to correspond to this three-dimensional interpretation of the network. Every node in this network has connections to its neighbors in the x-direction while only 'even' nodes have connections in the y-direction and only 'odd' nodes have connections in the z-direction. Because the connections alternate between y- and z- we refer to this network as an alternating cube. This particular alternating cube has a radix-5 mesh in the x-dimension, a radix-4 torus in the y-dimension, and a radix-2 torus in the z-dimension. While the end-around connections form a 10-cycle in the x-dimension, we ignore those connections for purposes of analyzing this topology and consider the 10-cycle as two linear arrays of 5-nodes at different coordinates in the z-dimension. One skilled in the art will understand that this topology can be generalized to any number of dimensions with any radix in each dimension and either mesh or torus end connections in each dimension.

The alternating 3-cube of FIGS. 4 and 5 has two advantages compared to the folded 2-cube of FIG. 3 and one significant disadvantage. First, it has a slightly shorter average path length (3.26 vs. 3.5). This reflects the utility of the connections on the odd backplanes. More importantly, this network works nearly as well with one or both of the end-around connections in the x-dimension omitted. When just one of the connections is omitted, for example, the average path length increases slightly from 3.26 to 3.30 and the maximum channel load remains constant. In contrast, the average path length of the torus network increases from 3.5 to 4.3 and the maximum channel load is doubled (from 1.25 to 2.5) when this connection is opened. Thus, a network with an alternating cube topology can omit the costly hardware required to reconfigure the right end-around channel to allow expansion. With a torus network, on the other hand, this hardware is strictly required.

The disadvantage of the alternating cube is its throughput. The maximum channel loading of the network of FIG. 4 is 1.33 vs. 1.25 for the torus of FIG. 3. This 6% increase in maximum channel load corresponds to a 6% decrease in peak network throughput.

Figure 6:
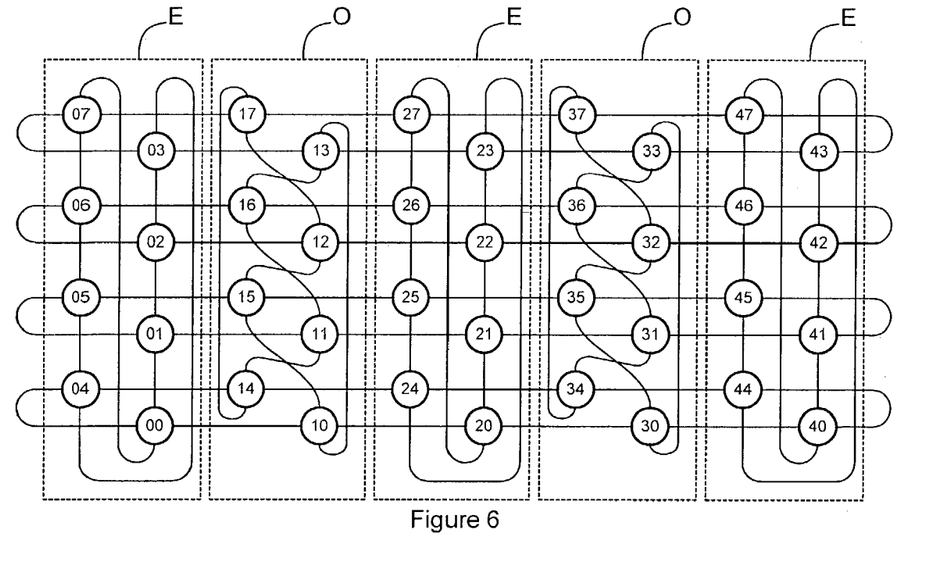
FIG. 6 is an illustration of an interleaved cube topology embodying the present invention.

The increased $C_{max}$ of the alternating cube network is caused by a load imbalance on channels in the x-dimension. This imbalance can be corrected by connecting the even- and odd-numbered backplanes in an interleaved cube topology as shown in FIG. 6. Because each node on a backplane can be reached by another node on the backplane without crossing to another backplane, loading of x-channels is reduced. This configuration has both a lower average path length (2.87 vs. 3.5) and a lower maximum channel load (1.20 vs 1.25) than the torus network. Like the alternating cube, this network has nearly the same performance ($D_{avg}$=2.93, $C_{max}$=1.20) when one of the end-around connections is omitted to save the cost of reconfiguration.

In the topology of FIG. 6, the nodes in each even-numbered backplane are wired in a single cycle that we use to define the y-dimension of the network, rather than the two cycles of FIG. 5. All nodes in FIG. 6 are labeled with a two-digit address where the first digit gives the backplane number (x-coordinate) and the second digit gives the y-coordinate. Moving in the x-dimension changes only the x-coordinate while moving in the y-dimension changes only the y-coordinate. The nodes in each odd-numbered backplane of FIG. 6 are also connected in a single cycle, but not the same cycle as the even-numbered backplanes.

Figure 7A:
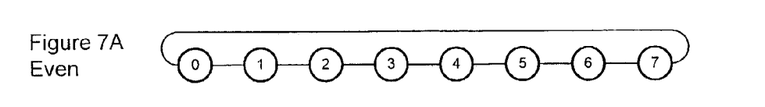
FIGS. 7A and 7B illustrate the y-dimension connections for the interleaved cube of FIG. 6 in the even and odd backplanes, respectively.
Figure 7B:
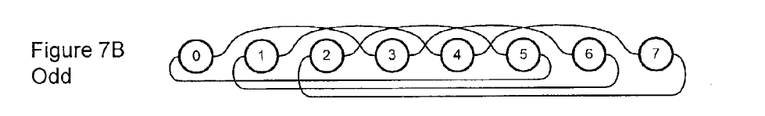

The relation between the even-numbered and odd-numbered backplanes in the interleaved cube is illustrated in FIGS. 7A and B. In the even-numbered backplanes of FIG. 7A, each node is connected to the next node ahead and the next node behind along the cycle. Nodes in the odd-numbered backplanes of FIG. 7B, on the other hand, are connected to the nodes three hops ahead and behind along the cycle.

It is significant that the even and odd backplanes support different configurations. The single cycle of each backplane enables communications between any two nodes on a backplane without leaving the backplane. However, the single cycle does result in increased distances between some nodes. For example, when node 001 is connected directly to node 031 in FIG. 5, the corresponding node 04 in FIG. 6 is now three hops away from node 07. However, if one considers a message traveling across many backplanes in a large system, a message may be routed from the lower torus to the upper torus in a single hop from the node 14 to the node 17. Whether a message is routed to a different x-dimension torus in either an even or an odd backplane is determined by which type of backplane provides the shortest path.

Up to this point we have described the alternating cube and interleaved cube topologies in two dimensions for simplicity. One skilled in the art will understand that these topologies can be realized with any number of dimensions.

Figure 8:
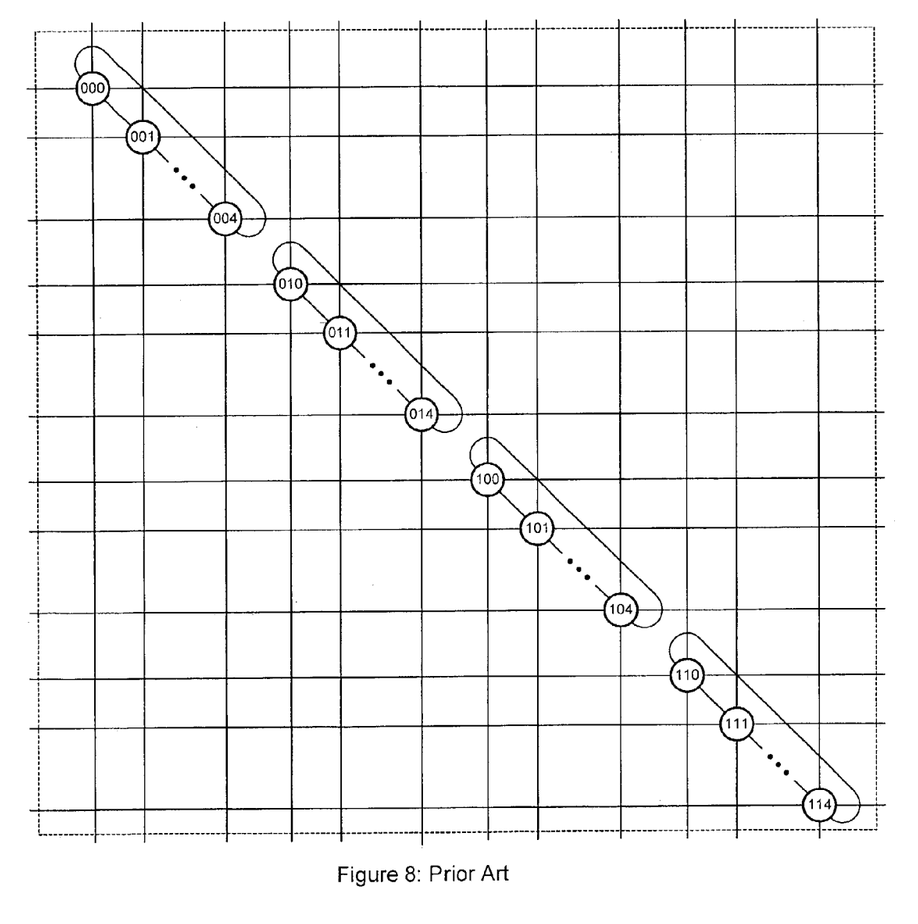
FIG. 8 illustrates a prior art 20-node backplane for a doubly folded 3 cube.

For example, in a preferred embodiment of the invention, the interleaved cube topology is applied to a 3-dimensional doubly-folded torus network (a doubly-folded 3-cube). A single backplane of the unmodified torus network, shown in FIG. 8, contains 20 nodes in four cycles of five. Each node is labeled with a three-digit number giving its relative x, y, and z-coordinates within the backplane. There are six ports on each node. The positive and negative ports in the x-dimension connect to the right and left edges of the backplane respectively. Similarly the positive and negative ports in the y-dimension connect to the top and bottom edges of the backplane. In contrast, the positive and negative ports in the z-dimension connect each node to the other nodes in its cycle. The z-dimension is wired entirely within the backplane while the x- and y-dimensions are wired entirely with backplane to backplane connections.

Figure 9:
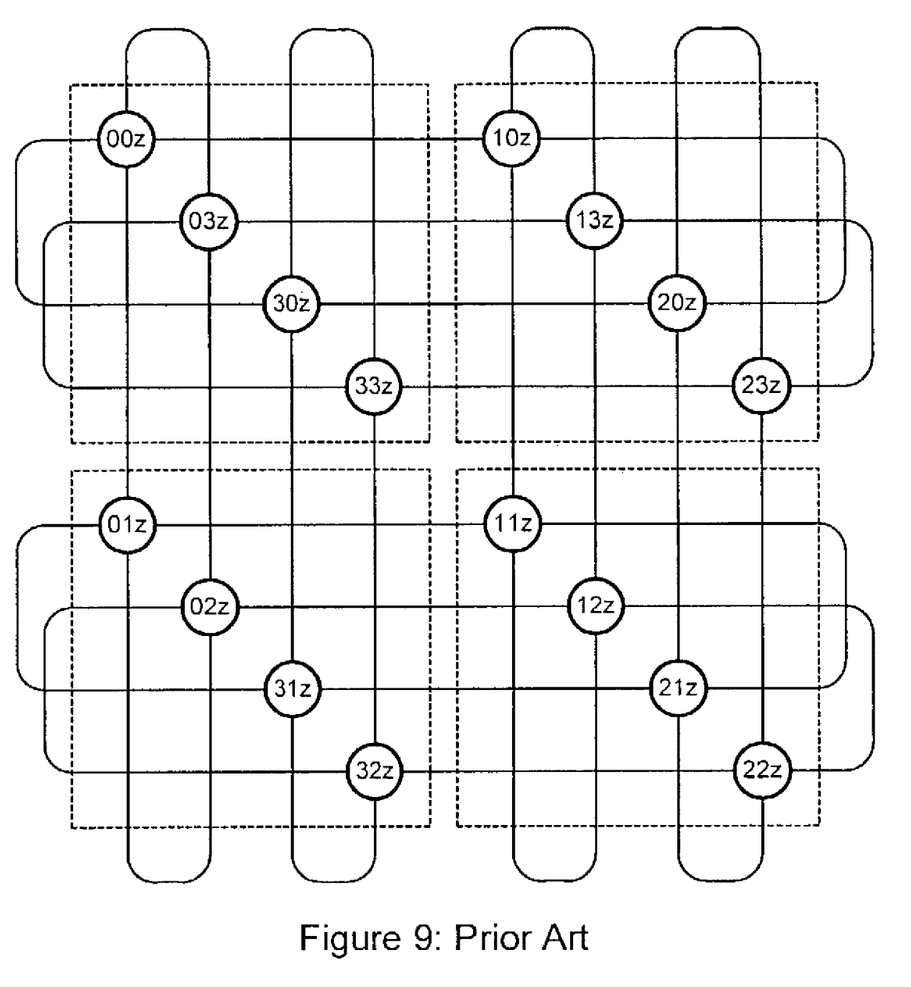
FIG. 9 illustrates one z plane of a prior art doubly folded torus showing connection between four backplanes.

The x- and y-connections between the backplanes of the doubly-folded 3-cube network are illustrated in FIG. 9. The figure shows one of the five z-planes for a 4×4×5 3-cube. The nodes in the other four z-planes are wired identically. The figure illustrates how the network is folded in both the x- and y-dimensions to realize a torus connection in both dimensions using only connections to nodes on adjacent backplanes. Note that since FIG. 9 has been extended to four backplanes, the numbering of the nodes does not directly correspond to that of FIG. 8. However, if one considers the backplane of FIG. 8 to be the upper left backplane of FIG. 9, the nodes 00z, 03z, 30z and 33z of FIG. 9 correspond, for example, to nodes 000, 010, 100 and 110 in one z plane or node 001, 011, 101 and 111 in another z plane.

FIG. 9 can be compared to two backplanes of FIG. 3. The difference between the circuits is that, in the y-dimension, the nodes of FIG. 9 are folded in the same manner as in the x-dimension. This allows for shorter end around channels and expansion in the y-dimension through edge connection of backplanes.

While FIG. 9 shows a 4×4×5 torus, one skilled in the art will understand how the network can be expanded at the right edge and the top edge to produce a network with any even number of nodes in the x- and y-dimensions and 5-nodes in the z-dimension. In the preferred embodiment the network may be expanded to 560-nodes with a 14×8×5 torus topology.

Figure 10:
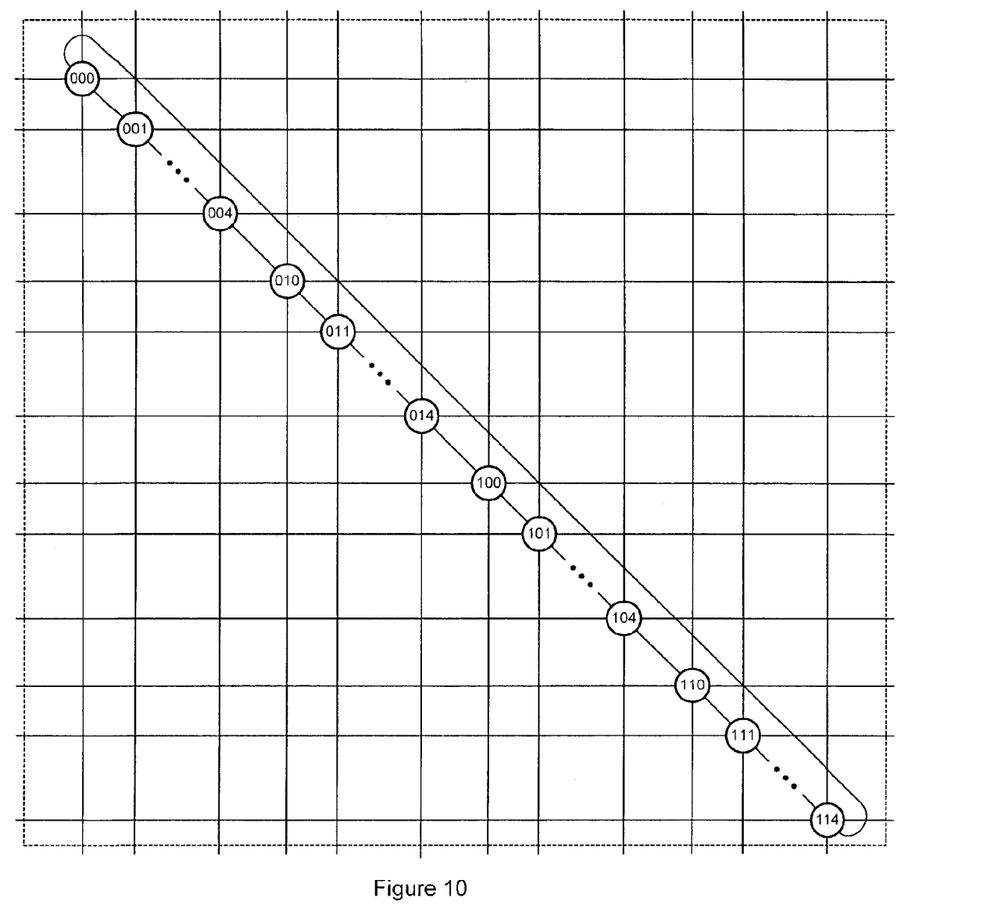
FIG. 10 illustrates an even numbered backplane for a three-dimensional interleaved torus embodying the invention.
Figure 11:
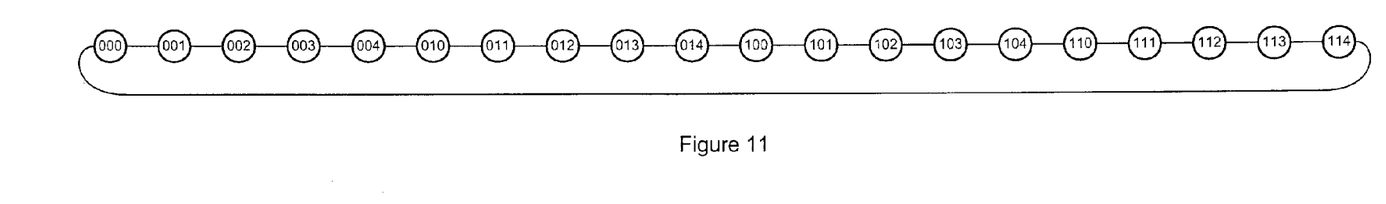
FIG. 11 shows the z connections for the even numbered backplane in the three-dimensional interleaved torus.
Figure 12:
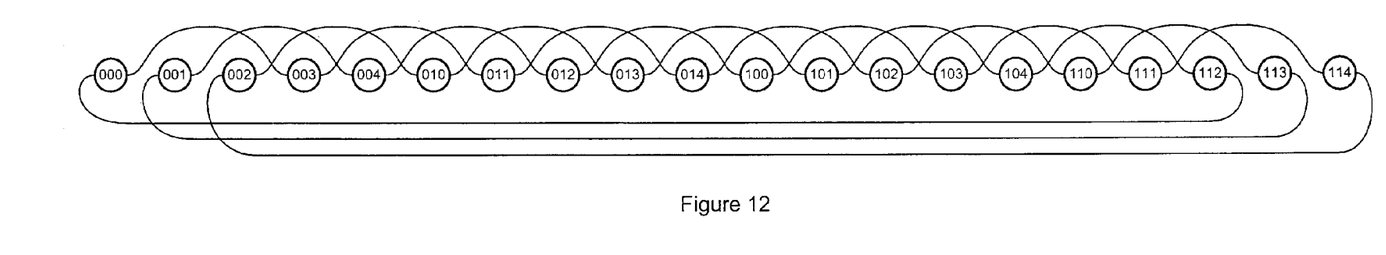
FIG. 12 illustrates the z connections for an odd numbered backplane in the three-dimensional interleaved torus.

The doubly-folded 3-cube network is converted to a 3-dimensional interleaved cube by connecting the even-numbered backplanes as illustrated in FIGS. 10 and 11 and the odd-numbered backplanes as illustrated in FIG. 12. In the doubly-folded torus network, an even-numbered backplane is one in which the sum of the x- and y-coordinates of the backplane is even. The even- and odd-numbered backplanes alternate in a checkerboard manner as the network is expanded.

As shown in FIG. 10, the nodes of each even-numbered backplane are connected in a single 20-cycle. FIG. 11 shows this same 20-cycle but with the x- and y-dimension channels omitted for clarity. Advancing along the z-channels of the network moves a packet through the 5-nodes in the z-dimension, but then, rather than looping back as in FIG. 8, the next hop in the z-dimension jumps to another side of an x- or y-torus. Referring to FIG. 9, the single cycle of FIG. 10 would connect node 00z not only to the other four nodes in its z cycle of FIG. 8 but also to the other z cycles of FIG. 8. For example, in FIG. 9, node 00z also connects to node 03z on the opposite side of the y-torus fold, node 30z on the opposite side of the x-torus fold and to node 33z on completely different x- and y-tori. As described above in the case of the 2-D interleaved cube network, this connection facilitates communication between nodes that are physically close to one another even though they may be at opposite positions along the x- or y-torus network.

The connections between the nodes on the odd-numbered backplanes for the 3-dimensional interleaved torus are shown in FIG. 12. As with the even-numbered backplanes, the nodes are connected in a 20-cycle. However, it is a different 20-cycle than in the even-numbered backplanes. As seen by a comparison of FIGS. 11 and 12, while advancing along a z-channel in an even-numbered backplane (FIG. 11) moves one step forward or backward along the z-cycle, advancing over a z-channel in an odd-numbered backplane (FIG. 12) moves three steps forward or backward along the cycle.

Figure 13:
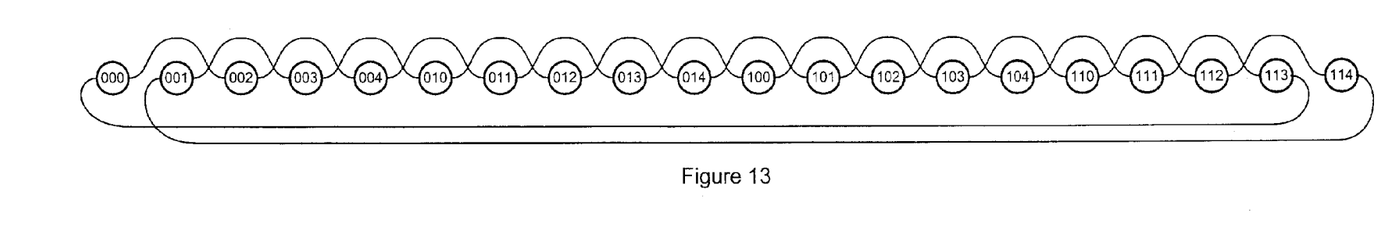
FIG. 13 illustrates the z connections for an even numbered backplane in an alternative three-dimensional interleaved torus.
Figure 14:
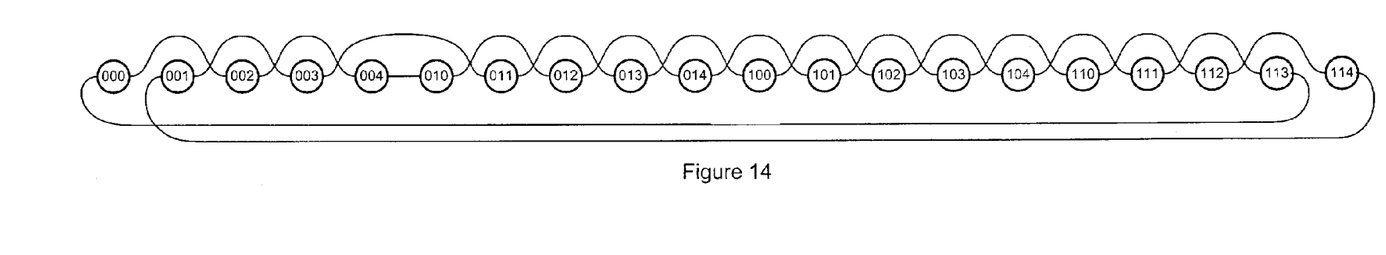
FIG. 14 illustrates the z connections for an even numbered backplane in a second alternative to the three-dimensional interleaved torus.

Somewhat better performance in channel loading can be achieved by connecting the even backplanes of the interleaved 3-D torus network in two 10-cycles as shown in FIG. 13. With this connection, advancing along a z-channel moves two steps forward or backward along the z-cycle. However, because the step size, two, is not relatively prime to the length of the cycle, 20, the connection does not form a single 20-cycle, but rather forms two 10-cycles. For applications where it is important that all of the nodes be connected in a single 20-cycle in the z-dimension, this topology can be modified as illustrated in FIG. 14. In this figure the two 10-cycles of FIG. 13 have been fused by connecting nodes 004 and 010 and nodes 003 and 011. The irregular topology of FIG. 14 has slightly lower performance than the topology of FIG. 13 but has the advantage that a single backplane is completely connected without any external end-around connections. However, the irregularity complicates the computation of routes.

One skilled in the art will understand that there are many variations on the interleaved topology described here. In particular there may be any number of dimensions (not just 2 or 3) and each dimension may be organized as a torus or a mesh or even a more complex topology such as a butterfly or tree. The network need not be packaged on backplanes but may use some other packaging technology and hierarchy. For example, the nodes may be directly cabled together. The last dimension of the network need not be strictly local to a single backplane. The last dimension of the network need not be organized into a single cycle, but rather could be arranged as a group of cycles or linear arrays, or some combination of the two. Also, the cycles in the odd-numbered backplanes need not always advance by three relative to the even numbered backplanes. They can advance by any number that is relatively prime to the radix of the cycle and can even advance by irregular amounts.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An interconnection network comprising:
   a plurality of nodes; and
   a plurality of channels, each directly connecting a distinct pair of the nodes:
      a first subset of the channels connecting the nodes in a first dimension;
      a second subset of the channels connecting the nodes in at least a second dimension, the connection of the second subset of the channels differing at different coordinates along the first dimension, wherein the second subset of the channels connects the nodes in cycles or linear arrays in a second dimension, the ordering of the nodes in the cycles or linear arrays being different at different coordinates along the first dimension, the cycles or linear arrays of the second subset of the channels also connecting multiple nodes of each of plural cycles or linear arrays in the first dimension; and
      wherein the first subset of the channels are cycles or linear arrays that are folded and the second subset of the channels connect nodes on opposite sides of the folds.

2. An interconnection network as claimed in claim 1 wherein:
   the connection of the second subset of channels at a first set of coordinates in the first dimension connects nodes whose coordinates in the second dimension differ by a first number; and
   the connection of the second subset of channels at a second set of coordinates in the first dimension connects nodes whose coordinates in the second dimension differ by a second number.

3. An interconnection network as claimed in claim 2 wherein the first set of coordinates corresponds to even-numbered positions and the second set of coordinates corresponds to odd-numbered positions.

4. An interconnection network comprising
   a plurality of nodes; and
   a plurality of channels, each directly connecting a distinct pair of the nodes:
      a first subset of the channels connecting the nodes in a first dimension;
      a second subset of the channels connecting the nodes in a second dimension;
      a third subset of the channels connecting the nodes in at least a third dimension, the connection of the third subset of the channels differing at different coordinates along the first and second dimensions, wherein the third subset of the channels connects the nodes in cycles or linear arrays in a third dimension, the ordering of the nodes in the cycles or linear arrays being different at different coordinates along the first and second dimensions;
      the connection of the third subset of channels at a first set of coordinates in the first and second dimensions connects nodes whose coordinates in the third dimension differ by a first number;
      the connection of the third subset of channels at a second set of coordinates in the first and second dimensions connects nodes whose coordinates in the third dimension differ by a second number; and
      wherein the first set of coordinates corresponds to locations where the sum of the coordinates in the first and second dimensions is even.

5. A method of connecting nodes in the network comprising:
   connecting the nodes in a first dimension with a first subset of channels, each directly connecting a distinct pair of the nodes;

connecting the nodes in at least a second dimension with a second subset of channels, each directly connecting a distinct pair of the nodes, the connection of the second subset of channels differing at different coordinates along the first dimension, the second subset of channels also connecting the nodes in cycles or linear arrays in a second dimension, the ordering of the nodes in the cycles or linear arrays being different at different coordinates along the first dimension; and wherein the connection of the second subset of channels at a first set of coordinates in the first dimension connects nodes whose coordinates in the second dimension differ by a first number, and the connection of the second subset of channels at a second set of coordinates in the first dimension connects nodes whose coordinates in the second dimension differ by a second number, with the first set of coordinates corresponding to even-numbered positions and the second set or coordinates corresponding to odd-numbered positions.

6. A method as claimed in claim 5 wherein the cycles or linear arrays of the second subset of the channels connect multiple nodes of each of plural cycles or linear arrays in the first dimension.

7. A method as claimed in claim 6 wherein the first subset of the channels are cycles or linear arrays that are folded and the second subset of the channels connect nodes on opposite sides of the folds.

8. A method of connecting nodes in the network comprising:

connecting the nodes with a first subset of channels in a first dimension, each directly connecting a distinct pair of the nodes;

connecting the nodes with a second subset of channels in a second dimension, each directly connecting a distinct pair of the nodes;

connecting the nodes with a third subset of channels in at least a third dimension, each directly connecting a distinct pair of the nodes, the connection of the third subset of channels differing at different coordinates along the first and second dimensions, wherein the third subset of the channels connects the nodes in cycles or linear arrays in a third dimension, the ordering of the nodes in the cycles or linear arrays being different at different coordinates along the first and second dimensions;

wherein the connection of the third subset of channels at a first set of coordinates in the first and second dimensions connects nodes whose coordinates in the third dimension differ by a first number and the connection of the third subset of channels at a second set of coordinates in the first and second dimensions connects nodes whose coordinates in the third dimension differ by a second number; and wherein the first set of coordinates corresponds to locations where the sum of the coordinates in the first and second dimensions is even.

9. A interconnection network comprising:

a plurality of nodes;

means for connecting the nodes in a first dimension;

means for connecting the nodes in at least a second dimension, the connection of the nodes in at least the second dimension differing at different coordinates along the first dimension, wherein the second subset of channels connects the nodes in cycles or linear arrays in a second dimension, the ordering of the nodes in the cycles or linear arrays being different at different coordinates along the first dimension;

the connection of the second subset of channels at a first set of coordinates in the first dimension connects nodes whose coordinates in the second dimension differ by a first number;

the connection of the second subset of channels at a second set of coordinates in the first dimension connects nodes whose coordinates in the second dimension differ by a second number; and wherein the first set of coordinates corresponds to even-numbered positions and the second set of coordinates corresponds to odd-numbered positions.

* * * * *

UNITED STATES PATENT AND TRADEMARK OFFICE
CERTIFICATE OF CORRECTION

PATENT NO. : 7,043,562 B2
APPLICATION NO. : 10/457718
DATED : May 9, 2006
INVENTOR(S) : William J. Dally, William F. Mann and Philip P. Carvey

It is certified that error appears in the above-identified patent and that said Letters Patent is hereby corrected as shown below:

On Title Page Item (73), Assignee
Delete "Avivi" and insert --- Avici ---.

Column 9, claim 5, line 18
Delete "or" and insert --- of ---.

Signed and Sealed this

Twenty-second Day of August, 2006

JON W. DUDAS
*Director of the United States Patent and Trademark Office*